(12) United States Patent
Tondu et al.

(10) Patent No.: US 11,207,869 B2
(45) Date of Patent: Dec. 28, 2021

(54) AERONAUTICAL LAMINATED GLAZING WITH MINIMUM DEFORMATION IN THE EVENT OF ALL OF THE GLASS SHEETS OF SAME BREAKING

(71) Applicant: SAINT-GOBAIN GLASS FRANCE, Courbevoie (FR)

(72) Inventors: Thomas Tondu, Saint-Martin-D'Abbat (FR); Cyril Lago-Gomez, Bonnee (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 16/769,496

(22) PCT Filed: Dec. 11, 2018

(86) PCT No.: PCT/FR2018/053206
§ 371 (c)(1),
(2) Date: Jun. 3, 2020

(87) PCT Pub. No.: WO2019/115933
PCT Pub. Date: Jun. 20, 2019

(65) Prior Publication Data
US 2020/0384737 A1    Dec. 10, 2020

(30) Foreign Application Priority Data
Dec. 13, 2017    (FR) ...................... 1762048

(51) Int. Cl.
| | | |
|---|---|---|
| B32B 17/10 | (2006.01) | |
| B32B 7/12 | (2006.01) | |
| B32B 27/30 | (2006.01) | |
| B32B 27/40 | (2006.01) | |
| B64C 1/14 | (2006.01) | |

(52) U.S. Cl.
CPC .......... B32B 17/10045 (2013.01); B32B 7/12 (2013.01); B32B 17/1077 (2013.01); B32B 17/10091 (2013.01); B32B 17/10137 (2013.01); B32B 17/10385 (2013.01); B32B 17/10761 (2013.01); B32B 27/30 (2013.01); B32B 27/40 (2013.01); B64C 1/1492 (2013.01); *B32B 2307/558* (2013.01); *B32B 2315/08* (2013.01); *B32B 2329/06* (2013.01); *B32B 2375/00* (2013.01); *B32B 2419/00* (2013.01); *B32B 2605/006* (2013.01); *B32B 2605/18* (2013.01)

(58) Field of Classification Search
CPC .. B32B 7/00–7/14; B32B 27/00–27/42; B32B 17/00–17/1099; B60J 1/00–1/2097; B64C 1/00–1/406
See application file for complete search history.

(56) References Cited

U.S. PATENT DOCUMENTS

| | | | |
|---|---|---|---|
| 3,592,726 A * | 7/1971 | Blizard | ............. B32B 17/10036 428/215 |
| 3,953,630 A | 4/1976 | Roberts et al. | |
| 2007/0060465 A1 | 3/2007 | Varshneya et al. | |
| 2014/0087193 A1 | 3/2014 | Cites et al. | |
| 2015/0064374 A1 * | 3/2015 | Jain | ......................... B32B 37/18 428/34 |
| 2016/0002103 A1 | 1/2016 | Wang et al. | |
| 2017/0348945 A1 | 12/2017 | Chaussade et al. | |

FOREIGN PATENT DOCUMENTS

| | | |
|---|---|---|
| EP | 0 459 704 A1 | 12/1991 |
| FR | 2 175 910 A1 | 10/1973 |
| WO | WO 2011/103801 A1 | 9/2011 |
| WO | WO-2016108005 A1 * | 7/2016 ....... B32B 17/10211 |

OTHER PUBLICATIONS

Macrelli, G. "Chemical Strengthening of Glass by Ion-Exchange", Workshop at the 2017 ICG Annual Meeting Istanbul—Turkey, Oct. 24, 2017; pp. 1-101.*
International Search Report as issued in International Patent Application No. PCT/FR2018/053206, dated Apr. 12, 2019.

* cited by examiner

*Primary Examiner* — Prashant J Khatri
(74) *Attorney, Agent, or Firm* — Pillsbury Winthrop Shaw Pittman LLP

(57) ABSTRACT

A laminated glazing for a vehicle or a building, includes an inner structural glass sheet having a surface compressive stress of between 400 and 1000 MPa with exchange depths of between 100 and 500, for example at least equal to 150 µm and an outer structural glass sheet having a surface compressive stress of between 50 and 300 MPa with exchange depths of between 50 and 100 µm, on condition that the product of the two is at most equal to 25 000 MPa·µm.

19 Claims, No Drawings

AERONAUTICAL LAMINATED GLAZING WITH MINIMUM DEFORMATION IN THE EVENT OF ALL OF THE GLASS SHEETS OF SAME BREAKING

CROSS-REFERENCE TO RELATED APPLICATIONS

This application is the U.S. National Stage of PCT/FR2018/053206, filed Dec. 11, 2018, which in turn claims priority to French patent application number 1762048 filed Dec. 13, 2017. The content of these applications are incorporated herein by reference in their entireties.

The aeronautical glazings of aircraft subject to the requirements of resistance to bird strikes and which are pressurized (for example commercial aviation) must withstand the breakage of one of the structural plies of the glazing: the breakage of one of the plies must not lead to either the loss of the glazing or the depressurization of the cockpit. A ply denotes a constituent sheet of a laminated glazing; it may be a sheet of glass, or a sheet of polymer material. A structural ply denotes a sheet having a thickness sufficient to be considered as contributing to the solidity, to the mechanical strength, and to the breaking strength of the structure.

No normative requirement demands the resistance of the laminated glazing in the event of breakage of all the glass plies. However, in an increasing flight safety approach, this requirement may be added by certain constructors.

Glazings made of glass are particularly exposed to the risks of depressurization in the event of breakage of all the glass plies.

Aeronautical glazings are laminated glazings composed either of sheets of glass, or of sheets of polymer materials (typically aeronautical quality polymethyl methacrylate (PMMA)), or of sheets of glass and of polymer materials assembled together by adhesive interlayers (thermoplastic interlayers such as polyvinyl butyral (PVB) or polyurethane (PU)).

In the case of a glazing made of glass, the resistance to bird strikes is ensured by two thick glasses with a very high breaking stress. This high breaking stress may be obtained by intense thermal tempering but much more preferably by chemical reinforcement.

There are two structural plies, so that, in the event of breakage (irrespective of the reason therefor) of one of these glasses, the glazing preserves its resistance to the internal pressurization of the cockpit and continues to provide the pressurization thereof.

Glazings referred to as bolted glazings (bolted connection between glazing and structure (aircraft body)) for which the glazing is integrally connected to the aircraft structure are not, or not very, sensitive to the breakages of all the plies. It is the interlayer that then acts as a membrane which swells without breaking while ensuring the sealing. Bolted glazings may have structural plies made of polymer material and therefore directly drilled for attachment to the structure, or structural plies made of glass to which drilled (metal and/or composite) inserts are bonded at the periphery, enabling connection to the structure.

Clamped glazings are only connected to the structure by clamping of the peripheral seal of the glazing. In the event of breakage of all the plies, the stiffness of the glazing drops and these glazings risk becoming dislodged.

Bolted glazings are particularly expensive:
aeronautical PMMA is an expensive material;
the bonding of inserts onto glass glazing is complex.

Furthermore, bolting leads to high mechanical stressing of the glazing by the structure deforming owing to the aircraft pressurization.

Glazings made of glass have a high, preferably chemical, reinforcement. This reinforcement places the faces of the glass under compression, and inevitably the core under tension. This tensioning of the core gives rise to total fracturing of the glass in the event of local breakage initiation. The higher the stress at the core, the more the glass breaks into small pieces; after breakage of all the plies, the laminate of interlayer adhesives and of broken glass is much more pliable.

There is therefore a contradiction between the requirement of resistance to bird strike which requires intense reinforcements of the glass and the need for pressure resistance in the event of breakage of all the plies.

When the structural part of a laminated glazing consists of an outer glass sheet (outside atmosphere side) and of an inner glass sheet (cockpit side of an aircraft for example), and when this laminated glazing is subjected to a bird strike, the surface of the laminated glazing that receives the impact is deformed, forming a concavity and creating a compressive stress; the surface of the laminated glazing opposite the impact is deformed the other way, forming a convexity and creating a tensile stress. Yet the glass performs very well under compression, even without reinforcement; quite the contrary, it is necessary to reinforce glass having a surface that deforms under tension.

It is therefore here the inner structural sheet which is subjected to high mechanical tensile stresses, the outer structural sheet being very substantially less stressed. Nevertheless, the presence of this less stressed outer glass sheet mechanically stiffens the laminated glazing and limits the stressing of the inner glass sheet.

The invention consists in differentiating the mechanical properties of the two structural plies by favoring:
high breaking stress (and therefore undesirable fracturing into small pieces) for the cockpit side ply, the most stressed ply during a bird strike;
large fragmentation on the outermost structural ply of the aircraft (not very stressed during the bird strike) so as to limit the deformations linked to the pressure in the event of breakage of all the glass plies.

This objective is achieved by the invention one subject of which is, consequently, a laminated glazing for a vehicle or a building, characterized in that it comprises an inner structural glass sheet having a surface compressive stress of between 400 and 1000 MPa with exchange depths of between 100 and 500, preferably at least equal to 150 µm and an outer structural glass sheet having a surface compressive stress of between 50 and 300 MPa with exchange depths of between 50 and 100 µm, on condition that the product of the two is at most equal to 25 000 MPa·µm.

In the event of bird strike, the inner structural glass sheet, which is the only one substantially tensilely stressed, withstands well considering its high surface compressive stress, and makes it possible to maintain the integrity of the two structural plies of the glazing.

If for any other reason all the structural glass sheets happened to break, for example following an electrical fault, the inner structural glass sheet would break into small pieces and the outer structural glass sheet into larger pieces, so that the laminated glazing held by the adhesive interlayer bonding the two structural glasses, fastened to the assembly structure by bolting or clamping, would be deformed relatively little. In the particular case of clamped glazing, the small deformations of the laminated glazing subjected to the pressurization of the cockpit reduce the risks of the glazing becoming dislodged, particularly for large-size glazings.

As a secondary advantage of the laminated glazing of the invention, the surface compressive stress over a substantial depth of the inner structural glass sheet gives it a low scratch sensitivity.

According to other preferred features of the laminated glazing of the invention:

- the inner and outer structural glass sheets have identical or different thicknesses of between 3 and 20 mm, and the sum of their thicknesses is between 10 and 20 mm;
- the inner and outer structural glass sheets are of soda-lime or aluminosilicate type;
- the structural glass sheets are chemically reinforced; the chemical reinforcement consists for example of the substitution of sodium ions by potassium ions, or of lithium ions by sodium ions, i.e. each time by larger ions, at the surface of the glass sheets; it is this which increases their surface compressive stress;
- the inner and outer structural glass sheets are bonded to one another by means of a first adhesive interlayer having a thickness of between 0.5 and 5, preferably between 1.8 and 3.2 mm;
- the laminated glazing comprises, on the side of the outer structural glass sheet opposite the inner structural glass sheet, an outer glass sheet having a thickness between 0.5 and 5 mm; this thin and nonstructural outer glass sheet constitutes the outer surface of the laminated glazing, in contact with the outside atmosphere;
- the outer glass sheet is of soda-lime or aluminosilicate type; like the structural glass sheets;
- this outer glass sheet is semi-tempered or chemically reinforced;
- the outer glass sheet is bonded to the outer structural glass sheet by means of a second adhesive interlayer having a thickness of between 3 and 12 mm;
- the face of the outer glass sheet oriented toward the outer structural glass sheet supports a network of heating wires and/or an electrically-conductive heating layer: copper wires, layer of tin-doped indium oxide ITO (indium tin oxide), connected to an electrical power supply by means of collectors (busbars); this positioning of the heating function provides the deicing of the surface of the laminated glazing in contact with the outside atmosphere, under all usage conditions, while minimizing the electric power required (proximity to the ice);
- one face of the inner or outer structural glass sheet supports a network of heating wires and/or an electrically-conductive heating layer as described above; this positioning of the heating function provides the demisting of the surface of the laminated glazing in contact with the atmosphere of the aircraft cockpit;
- the face of the outer glass sheet opposite the outer structural glass sheet is flush with the assembly structure; in other words, this face is in the continuity of the structure (aircraft body); an essential function of the outer glass sheet is the aerodynamic performance of the aircraft, and to a lesser extent the appearance;
- an adhesive interlayer comprises a polyvinyl butyral (PVB), a polyurethane (PU), an ethylene/vinyl acetate copolymer (EVA) or the like;
- the laminated glazing is curved (concavity toward the inside of the vehicle or of the building in the assembly position);
- a reinforcing sheet is inserted between the inner and outer structural glass sheets, over a portion at least of a peripheral zone of the laminated glazing; this is a strip of reinforcing material such as metal or fiber composite (Kevlar® or the like) material, along a significant portion of the peripheral zone of the laminated glazing; this reinforcing sheet is subjected to the local stress applied by the windowpane retainer and which would risk locally breaking the inner structural glass into small pieces; the reinforcing sheet prevents the tearing of the adhesive interlayer at the contact boundary between windowpane retainer and glazing.

A further subject of the invention is the use of a laminated glazing as described above in aeronautics, in particular as pressurized aircraft glazing.

The invention is now illustrated by the following exemplary embodiment.

EXAMPLE

A laminated glazing of pressurized commercial aircraft cockpit consists, from the inside of the aircraft outward:

- of an 8-mm thick inner structural sheet of aluminosilicate glass with a chemical reinforcement generating a surface stress of 450 MPa for an exchange depth of 200 µm;
- of an 8-mm thick outer structural sheet of soda-lime glass with a chemical reinforcement generating a surface stress of 250 MPa for an exchange depth of 60 µm; and
- of a semi-tempered (surface stress of 50 MPa) 3-mm thick outer soda-lime glass sheet.

The two structural glass sheets are bonded by means of a 2-mm thick PVB adhesive interlayer.

The outer structural glass sheet and the outer glass sheet are bonded by means of a 10-mm thick PU adhesive interlayer.

The face of the outer glass sheet oriented toward the outer structural glass sheet bears a deicing heating layer of ITO. This is in particular the case for a frontal deicing glazing of an aircraft cockpit. As specified above, in the case of a demisting glazing, the heating function may be supported by any surface of the structural block in the laminate.

The outer face of the outer glass sheet lies flush with the body of the aircraft, assembly environment of the laminated glazing.

In the event of breakage of the two structural glass sheets of the laminated glazing, the large fragmentation of the outer structural glass sheet, i.e. into pieces of large dimensions, provides a minimal deformation of the glazing under the effect of the pressure.

Furthermore, this eventuality of breaking of the two structural glass sheets is minimized by the surface compressive stress characteristics thereof.

The invention claimed is:

1. A laminated glazing for a vehicle or a building, comprising an inner structural glass sheet defining an interior side of the laminated glazing and having a surface compressive stress of between 400 and 1000 MPa with exchange depths of between 100 and 500 µm and an outer structural glass sheet having a surface compressive stress of between 50 and 300 MPa with exchange depths of between 50 and 100 µm, on condition that the product of the compressive stress and the exchange depths of the outer structural glass sheet is at most equal to 25 000 MPa·µm, wherein the inner and outer structural glass sheets have identical or different thicknesses that are each between 3 and 20 mm.

2. The laminated glazing as claimed in claim 1, wherein a sum of the thicknesses of the inner and outer structural glass sheets is between 10 and 20 mm.

3. The laminated glazing as claimed in claim 1, wherein the inner and outer structural glass sheets have a soda-lime or aluminosilicate composition.

4. The laminated glazing as claimed in claim 1, wherein the inner and outer structural glass sheets are chemically reinforced.

5. The laminated glazing as claimed in claim 1, wherein the inner and outer structural glass sheets are bonded to one another by means of a first adhesive interlayer having a thickness of between 0.5 and 5 mm.

6. The laminated glazing as claimed in claim 5, wherein the thickness of the first adhesive interlayer is between 1.8 and 3.2 mm.

7. The laminated glazing as claimed in claim 1, comprising, on a side of the outer structural glass sheet opposite the inner structural glass sheet, an outer glass sheet having a thickness between 0.5 and 5 mm.

8. The laminated glazing as claimed in claim 7, wherein the outer glass sheet has a soda-lime or aluminosilicate composition.

9. The laminated glazing as claimed in claim 7, wherein the outer glass sheet is semi-tempered or chemically reinforced.

10. The laminated glazing as claimed in claim 7, wherein the outer glass sheet is bonded to the outer structural glass sheet by means of a second adhesive interlayer having a thickness of between 3 and 12 mm.

11. The laminated glazing as claimed in claim 7, wherein a face of the outer glass sheet oriented toward the outer structural glass sheet supports a network of heating wires and/or an electrically-conductive heating layer.

12. The laminated glazing as claimed in claim 1, wherein one face of the inner or outer structural glass sheet supports a network of heating wires and/or an electrically-conductive heating layer.

13. The laminated glazing as claimed in claim 7, wherein the face of the outer glass sheet opposite the outer structural glass sheet is flush with the assembly structure.

14. The laminated glazing as claimed in claim 5, wherein an adhesive interlayer comprises a polyvinyl butyral, a polyurethane, or an ethylene/vinyl acetate copolymer.

15. The laminated glazing as claimed in claim 1, wherein the laminated glazing is curved.

16. The laminated glazing as claimed in claim 1, wherein a reinforcing sheet is inserted between the inner and outer structural glass sheets, over a portion at least of a peripheral zone of the laminated glazing.

17. The laminated glazing as claimed in claim 1, wherein the inner structural glass sheet has a surface compressive stress of between 400 and 1000 MPa with exchange depths at least equal to 150 µm.

18. A method comprising utilizing a laminated glazing as claimed in claim 1 in aeronautics.

19. The method as claimed in claim 18, wherein the laminated glazing is a pressurized aircraft glazing.

* * * * *